3,176,032
17α,21-DIACYLOXY DERIVATIVES OF 6α-METHYL-Δ$^{1,4}$-PREGNADIEN-3,20-DIONE AND OF 6α-METHYL-Δ$^4$-PREGNEN-3,20-DIONE
Howard J. Ringold and George Rosenkranz, Mexico City, Mexico, assignors, by mesne assignments, to Syntex Corporation, a corporation of Panama
No Drawing. Filed Apr. 16, 1959, Ser. No. 806,762
Claims priority, application Mexico, Apr. 18, 1958, 50,758
1 Claim. (Cl. 260—397.47)

The present invention relates to novel cyclopentanophenanthrene derivatives and to a method for preparing these compounds.

More particularly, the present invention relates to 17α,21-diacyloxy derivatives of 6α-methyl-Δ$^{1,4}$-pregnadien-3,20-dione and of 6α-methyl-Δ$^4$-pregnen-3,20-dione. These compounds are progestational hormones.

The novel progestational hormones of the present invention are illustrated by the following formula:

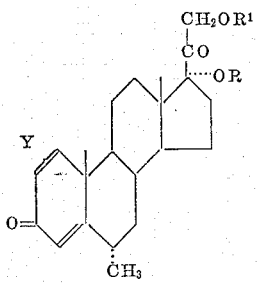

In the above formula R and R$^1$ represent the same or different acyl groups of a hydrocarbon carboxylic acid of up to 12 carbon atoms. These may be substituted or unsubstituted, straight or branched chain aliphatic, cyclic or mixed cyclic aliphatic. Typical acyl groups are acetate, propionate, butyrate, hemisuccinate, enanthate, caproate, benzoate and cyclopentylpropionate.

The process for the production of the novel compounds of the present invention is illustrated by the following equation:

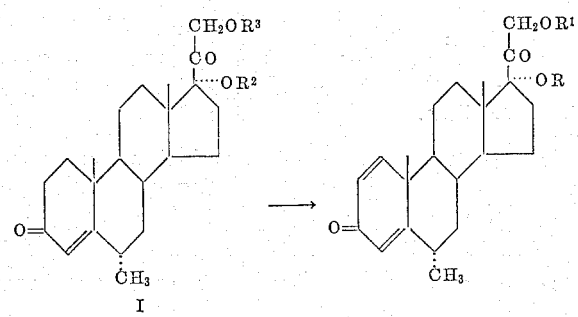

In the above equation R and R$^1$ represent the same groups as heretofore, and R$^2$ and R$^3$ represent either acyl groups of hydrocarbon carboxylic acids of up to 12 carbon atoms or hydrogen.

For the esterification of the hydroxyl groups of 6α-methyl-"S" (I; R$^2$=R$^3$=H), we treated it with the anhydride of any hydrocarbon carboxylic acid of up to 12 carbon atoms, in mixture with a solvent such as benzene or ethyl acetate and in the presence of an acid catalyst, such as p-toluenesulfonic acid, for example, and thus we obtained the corresponding 17,21-diester (I; R$^2$=R$^3$=acyl, R$^3$=acetate). Alternatively we first esterified 6α-methyl-"S" at C-21, by reaction with an anhydride in mixture wiht pyridine and at room temperature, and the resulting 21-ester was then treated with another anhydride in mixture with a solvent and an acid catalyst, to produce mixed diesters (I; R$^2$ and R$^3$ represent different acyl groups).

We refluxed a diester of Formula I with selenium dioxide in mixture with t-butanol, in the presence of pyridine and under an atmosphere of nitrogen and thus we produced the corresponding diester of 1-dehydro-"S" (II, the acyloxy groups may be different or identical).

The preparations illustrate the production of the starting materials.

PREPARATION 1

A mixture of 15 g. of 17α-hydroxyprogesterone, 300 cc. of benzene, 80 cc. of ethylene glycol previously distilled over potassium hydroxide, and 1.8 g. of p-toluenesulfonic acid was refluxed for 18 hours with the use of an adapter for the continuous removal of the water formed during the reaction. It was then neutralized with a saturated solution of sodium bicarbonate, washed with water to neutral, dried over anhydrous sodium sulfate and evaporated to dryness under reduced pressure. There was thus obtained 19.1 g. of 3,20-diethylenedioxy-Δ$^5$-pregnen-17α-ol, namely, the diketal of 17α-hydroxyprogesterones which was used without further purification for the next step.

18 g. of the above crude ketal was treated with 1.1 molar equivalents of perbenzoic acid in chloroform solution. The mixture was kept standing at room temperature and at the end of 20 hours a tritration showed that 0.9 molar equivalents of the peracid had been consumed. The solution was then washed with dilute sodium hydroxide and water and evaporated to dryness. Chromatography of the residue in a column with 600 g. of neutral activated alumina yielded 10.3 g. of 3,20-diethylenedioxy-5α,6α-oxido, pregnan-17α-ol.

A solution of 10 g. of the above compound in 400 cc. of anhydrous thiophene free benzene was treated with 50 cc. of a solution of methyl magnesium bromide in ether and the mixture was refluxed for 6 hours, cooled and poured into ice water containing an ammonium chloride. The benzene layer was separated, the aqueous phase was extracted with ethyl acetate and the combined benzene and ethyl acetate solution was evaporated to dryness. Chromatography of the residue in a column with 500 g. of neutral alumina afforded 6.5 g. of 3,20-diethylenedioxy-6β-methyl-pregnan-5α,17α-diol.

6 g. of the diketal was dissolved in 1000 cc. of ethanol and mixed with 150 cc. of dilute sulfuric acid (8% by volume). The mixture was refluxed for 40 minutes on the steam bath, cooled and neutralized with solid sodium bicarbonate. After pouring into water, the product was extracted with ethylacetate, washed with water, dried over anhydrous sodium sulfate and evaporated to dryness in vacuum. We have found that the crude product thus obtained represents a mixture of partially dehydrated material and of the 5-hydroxy compound. In order to complete the dehydration, the mixture was dissolved in 200 cc. of methanol containing 8 g. of potassium hydroxide and the solution was kept for 1 hour at 20° C. under an atmosphere of nitrogen. The reaction mixture was neutralized with acetic acid, diluted with 800 cc. of water and extracted several times with methylene dichloride. The extract was washed with water, dried over anhydrous sodium sulfate and evaporated to dryness under vacuum. The residue was chromatographed in a column with washed neutral alumina. There was thus obtained 3.0 g. of the desired 6α-methyl-Δ$^4$-pregnen-17α-ol-3,20-dione, also named 6α-methyl-17α-hydroxyprogesterone.

PREPARATION 2

A cooled solution of 2 g. of 6α-methyl-17α-hydroxyprogesterone in 15 cc. of tetrahydrofurane and 9 cc. of methanol was treated under continuous stirring with 3 g. of pure calcium oxide and then with 3 g. of iodine which was added in small portions. The stirring was continued at room temperature until the solution had a pale yellow color. It was then poured into ice water containing 9 cc. of glacial acetic acid and 1 g. of sodium thiosulfate and stirred for 15 minutes; the clear solution was decanted and the precipitate of the crude 21-iodo-6α-methyl-17α-hydroxyprogesterone was collected by filtration, washed with water, dried under vacuum and mixed with 50 cc. of anhydrous acetone and 4 g. of recently fused potassium acetate. The mixture was refluxed under anhydrous conditions for 18 hours, the acetone was removed by distillation and the residue treated with water. The water was decanted from the oil which separated, and the latter was redissolved in methylene dichloride. The solution was washed with water, dried over anhydrous sodium sulfate and the methylene dichloride was evaporated. The residue was refluxed for 15 minutes with 0.5 g. of sodium bisulfite dissolved in 25 cc. of methanol and 5 cc. of water and then the solvent was removed by distillation under reduced pressure. Ice water was added to the residue and the precipitate was collected and recrystallized from acetone-water, thus yielding the 21-acetate of 6α-methyl-$\Delta^4$-pregnen-17α-21-diol-3,20-dione.

By conventional saponification as set forth in Example IV there was obtained the free 6α-methyl-$\Delta^4$-pregnen-17α,21-diol-3,2-dione. By reacting this free compound with propionic anhydride in the presence of pyridine in a conventional way there was produced the 21-propionate. In a similar conventional reaction with other anhydrides and acid chlorides there was prepared the 21-benzoate, the 21-cyclopentylpropionate and other ester groups conventionally known for the esterification of steroid alcohols.

The following specific examples serve to illustrate but are not intended to limit the present invention.

*Example I*

A solution of 5 g. of 6α-methyl-$\Delta^4$-pregnen-17α,21-diol-3,20-dione in 500 cc. of benzene and 50 cc. of acetic anhydride was treated with 1 g. of p-toluenesulfonic acid and stirred for 24 hours at room temperature. It was then diluted with ice water and the organic layer was separated, washed with water, 5% sodium carbonate solution and water to neutral, dried over anhydrous sodium sulfate and the benzene was evaporated. The residue was purified by recrystallization from acetone-hexane. There was thus obtained 6α-methyl-$\Delta^4$-pregnen-17α,21-diol-3,20-dione diacetate.

A mixture of 2 g. of the above compound, 100 cc. of anhydrous t-butanol, 0.8 g. of selenium dioxide and 0.5 cc. of pyridine was refluxed for 72 hours under an atmosphere of nitrogen. The mixture was filtered through celite, washing the filter with t-butanol and the combined filtrate and washings was evaporated to dryness under reduced pressure. The residue was dissolved in acetone, treated with decolorizing charcoal, refluxed for half an hour, filtered, dried over anhydrous sodium sulfate and evaporated to dryness; the residue was purified by chromatography on neutral alumina. There was thus obtained 6α-methyl-$\Delta^{1,4}$-prenadien-17α,21-diol-3,20-dione diacetate.

*Example II*

In the method of the previous example there was substituted the acetic anhydride for propionic anhydride. There was thus obtained 6α-methyl-$\Delta^4$-pregnen-17α,21-diol-3,20-dione dipropionate and then 6α-methyl-$\Delta^{1,4}$-pregnadien-17α,21-diol-3,20-dione dipropionate.

*Example III*

A mixture of 1 g. of 6α-methyl-$\Delta^4$-pregnen-17α,21-diol-3,20-dione, 21-acetate, 20 cc. of the anhydride of cyclopentylpropionic acid, 100 cc. of benzene and 200 mg. of p-toluenesulfonic acid was stirred for 3 days at room temperature and the product was then worked up such as has been described in Example I. There was thus obtained 6α-methyl-$\Delta^4$-pregnen-17α,21-diol-3,20-dione 17-cyclopentylpropionate-21-acetate and then, by reaction with selenium dioxide, 6α-methyl-$\Delta^{1,4}$-pregnadien-17α,21-diol-3,20-dione 17-cyclopentylpropionate-21-acetate.

*Example IV*

A solution of 5 g. of 6α-methyl-$\Delta^4$-pregnen-17α,21-diol-3,20-dione in 20 cc. of anhydrous pyridine was treated with 6 g. of benzoic anhydride and kept overnight at room temperature; after pouring into water the mixture was heated for half an hour on the steam bath, cooled and extracted with ether. The extract was washed with 5% aqueous sodium carbonate solution and water to neutral, dried over anhydrous sodium sulfate and evaporated to dryness. Recrystallization of the residue from acetone-hexane furnished 6α-methyl-$\Delta^4$-pregnen-17α,21-diol-3,20-dione 21-benzoate.

5 g. of the above compound was treated with acetic anhydride, such as has been described in Example I. There was thus obtained 6α-methyl-$\Delta^4$-pregnen-17α,21-diol-3,20-dione 17-acetate-21-benzoate.

Upon subsequent dehydrogenation of the above compound, through the aforementioned reaction with selenium dioxide, there was obtained 6α-methyl-$\Delta^{1,4}$-pregnadien-17α,21-diol-3,20-dione 17-acetate-21-benzoate.

We claim:
The 17,21 hydrocarbon carboxylic acid diesters of up to 12 carbon atoms of 6α-methyl-$\Delta^{1,4}$-pregnadien-17α,21-diol-3,20-dione.

References Cited in the file of this patent
UNITED STATES PATENTS

| | | |
|---|---|---|
| 2,774,775 | Korman et al. | Dec. 18, 1956 |
| 2,802,839 | Ringold et al. | Aug. 13, 1957 |
| 2,878,246 | Miramontes et al. | Mar. 17, 1959 |